United States Patent [19]

Bell

[11] Patent Number: 4,958,378

[45] Date of Patent: Sep. 18, 1990

[54] METHOD AND APPARATUS FOR DETECTING CHANGES IN RASTER DATA

[75] Inventor: Alan E. Bell, Westford, Mass.

[73] Assignee: Sun Microsystems, Inc., Mountain View, Calif.

[21] Appl. No.: 343,866

[22] Filed: Apr. 26, 1989

[51] Int. Cl.[5] ............................................ G06K 9/00

[52] U.S. Cl. ...................................... 382/34; 358/105; 340/721

[58] Field of Search .................. 382/34; 358/105, 136, 358/139; 340/721

[56] References Cited

U.S. PATENT DOCUMENTS

| | | | |
|---|---|---|---|
| 4,484,192 | 11/1984 | Seitz et al. | 340/721 |
| 4,673,930 | 6/1987 | Bujalski et al. | 340/721 |
| 4,747,146 | 5/1988 | Nishikawa et al. | 340/715 |
| 4,779,131 | 10/1988 | Matsumoto et al. | 358/105 |
| 4,807,034 | 2/1989 | Takeuchi et al. | 358/105 |

*Primary Examiner*—Leo H. Boudreau

*Attorney, Agent, or Firm*—Blakely Taylor & Zafman

[57] ABSTRACT

A method and apparatus which provides for the real time comparison of raster data. The raster data is stored in memory such that raster data corresponding to a specific X-Y coordinate location is consistently written to the same memory location. During the process of storing the data in memory, the data currently stored in the memory is read and compared to the data to be written into the same location in memory. If the data is not the same, the discrepancy and location of the discrepancy is noted in a separate area of memory to be used for subsequent analysis and the data to be written to that location is immediately written into the memory. The method and apparatus of the present invention is particularly applicable to the video graphics environment wherein the current bit of raster image contained in the frame buffer is compared to the updated raster image and the data changes are noted on a pixel by pixel basis. Utilizing the information gathered on the changed pixels, the video display need only update the changed data, thereby minimizing the amount of data to be transferred and increasing the speed of the system. In a preferred embodiment, the method and apparatus of the present invention is employed to provide an interface between a video adapter such as a video graphics array (VGA) and video display system incompatible with the video adapter such as a windowing system whereby the video output generated by the video adapter is translated and input to the video display system for generation of the display in real time.

32 Claims, 8 Drawing Sheets

METHOD AND APPARATUS FOR DETECTING CHANGES IN RASTER DATA

BACKGROUND

In microprocessor based systems such as personal computers and the like the video hardware for controlling a video display (monitor) comprises a video adaptor which interfaces the video commands issued by the CPU to the monitor. One of the most popular video adaptors used in personal computers is the video graphics array (VGA) manufactured by International Business Machines, Armonk, N.Y. The VGA has gained such wide popularity and use that several manufacturers provide hardware that emulates the VGA and numerous software producers have developed software that utilize the VGA to produce the video output.

A block diagram of the VGA is shown in FIG. 1. The VGA comprises the VGA chip or controller 20, memory 10 which functions as the frame buffer and the storage of fonts and the like and the digital to analog converter (DAC) 30 referred to sometimes as the pallate chip which functions as the color lookup table for the color display as well as the driver for the monitor 40. VGA chip 20 is connected to the CPU through the PC bus. The CPU transmits to the VGA chip which receives the video commands regarding what information to display and not to display. To generate a display the CPU instructs the VGA chip 20 to display a certain set of data. Upon receipt of commands from the CPU, the VGA sends the required instructions—if it is in the text mode the 16-bits containing character attributes, if it is in the graphics mode the pixel information—to the memory 10 to generate the frame buffer image. The frame buffer image is then transmitted back to the VGA chip which forwards one pixel at a time the contents of the frame buffer to the DAC 30. The 4-bit pixel code (4 bits for 16 colors, 8 bits for 256 colors) transmitted to the DAC 30 is used to determine the color of the pixel through the color lookup table. Once the color of the pixel is determined through the lookup table, the digital signals are converted to analog signals and output to the monitor 40 for display. The contents of the frame buffer are read and transferred to the DAC 30 sixty (60) times a second in order to refresh the display on the monitor display 40. Due to the extreme popularity of the VGA, computer manufacturers have attempted to design video hardware and software that are backwards compatible with the VGA, such that popular software programs that are compatible only with the VGA will work on the more recent versions of computers.

However, a new feature found in the many of the newer multitasking computers, referred to as windowing, has made the problem of compatibility with the VGA even more difficult. Software programs which provide this feature include "Microsoft Windows", developed by Microsoft Corporation, Redmond, Wash. and "Presentation Manager", developed by International Business Machines, Armonk, N.Y. In a windowing environment, the screen may be divided up into a plurality of areas, each referred to as a window, in which different processes may be run simultaneously. For example, in a first window an accounting program may be operating while in a second window a drawing program may be running. The user of the computer has the ability to switch from window to window to operate the separate processes. The graphics portion of windowing system which contains the display is typically a separate program which receives as input the parameters designating the different windows on the screen and the applications that are to operate in each of the windows, such that when the application program indicates the display is to change that information is sent to the windowing system which takes the video information and massages the data, i.e., compresses the size of the data as well as clips and trims the data in view of the window and its relations to other windows displayed, and outputs the massaged data to the frame buffer of the monitor for display. Computer hardware developers have found however, that the VGA will not work in the window environment and have been unable to take a VGA generated display and allocate it to a portion of the screen. If a VGA-based process, that is a process which utilizes the VGA to generate its video output, is to be executed, the applications running under the windowing system must be suspended and saved and the screen blanked so that the VGA process can display its video image.

To overcome this problem there have been attempts to develop VGA emulation software that is compatible with the windowing system so that VGA-based processes are displayable within the windowing system. However, software emulators require a large amount of CPU overhead and dramatically slow down the time required to generate a display. Tests have shown that to generate a video image through a software emulator may to be up to 83 times slower than the time typically required to generate the same image in a non-windowing environment. The method and apparatus of the present invention seeks to overcome these problems by providing an interface between the VGA and a non-VGA compatible environment such as the windowing environment and system software such that VGA based applications may be displayed in the incompatible environment on a real time basis.

Furthermore, it has been found that the method and apparatus of the present invention may be utilized to perform real time comparisons of large blocks of raster data, such as seismic and geological data, radar data and video imaging data, data such as the data employed in image processing. Currently in such applications when two blocks of data are to be compared, the comparisons are performed by software which compares the blocks of data on a bit by bit basis. This is quite time consuming and makes real time processing of the data difficult except on large, powerful, main frame computers. The method and apparatus of the present invention provides a real time capability for the comparison and detection of changes in raster data without utilizing powerful main frame computers.

SUMMARY OF THE INVENTION

It is therefore an object of the present invention to provide an interface between a video adapter and an incompatible graphics display environment such that the output of the video adapter can be displayed within the incompatible graphics display environment on a real time basis.

It is an object of the present invention to provide an interface between a video adapter such as the vertical graphics array (VGA) video adapter and an incompatible graphics environment, such as a windowing system, wherein VGA-based applications may be displayed and output through the windowing system on a real time basis.

It is furthermore an object of the present invention to provide a method and apparatus that permits real time comparisons of and detections of changes between blocks of raster data.

In the method and apparatus of the present invention the data, i.e. raster data, is stored in memory. During the process of storing the data in memory, the data currently in the memory is read on a bit by bit basis and compared to the bits to be written into the same location in memory. Preferably a circuit such as a simple exclusive OR or comparator circuit is used to perform the comparison. If the data read from a certain location and the data to be written to that same location are not the same, the discrepancy and location of the discrepancy is noted in a separate area of memory to be used for subsequent analysis and the data to be written to that location is immediately written into the memory. Preferably, the type of memory to be used is a dynamic random access memory (DRAM) because the DRAM performs the read of the data currently in memory and the write of the new data into memory during one memory cycle.

The method and apparatus of the present invention is particularly applicable to the video graphics environment wherein the current bit or raster image contained in the frame buffer is compared to the updated raster image and the data changes are noted on a pixel by pixel basis using the method and apparatus of the present invention. Utilizing the information gathered on the changed pixels, the video display need only update the changed data, thereby minimizing the amount of data to be transferred and increasing the speed of the system.

In a preferred embodiment the method and apparatus of the present invention is employed to provide an interface between a video adapter such as a video graphics array (VGA) and a video display system incompatible with the video adapter such as a windowing system whereby the video output generated by the video adapter is translated and input to the video display system for generation of the display in real time.

BRIEF DESCRIPTION OF THE DRAWINGS

The objects, features and advantages of the method and apparatus of the present invention will be apparent from the following detailed description of the invention in which.

DETAILED DESCRIPTION OF THE INVENTION

Figure 1:
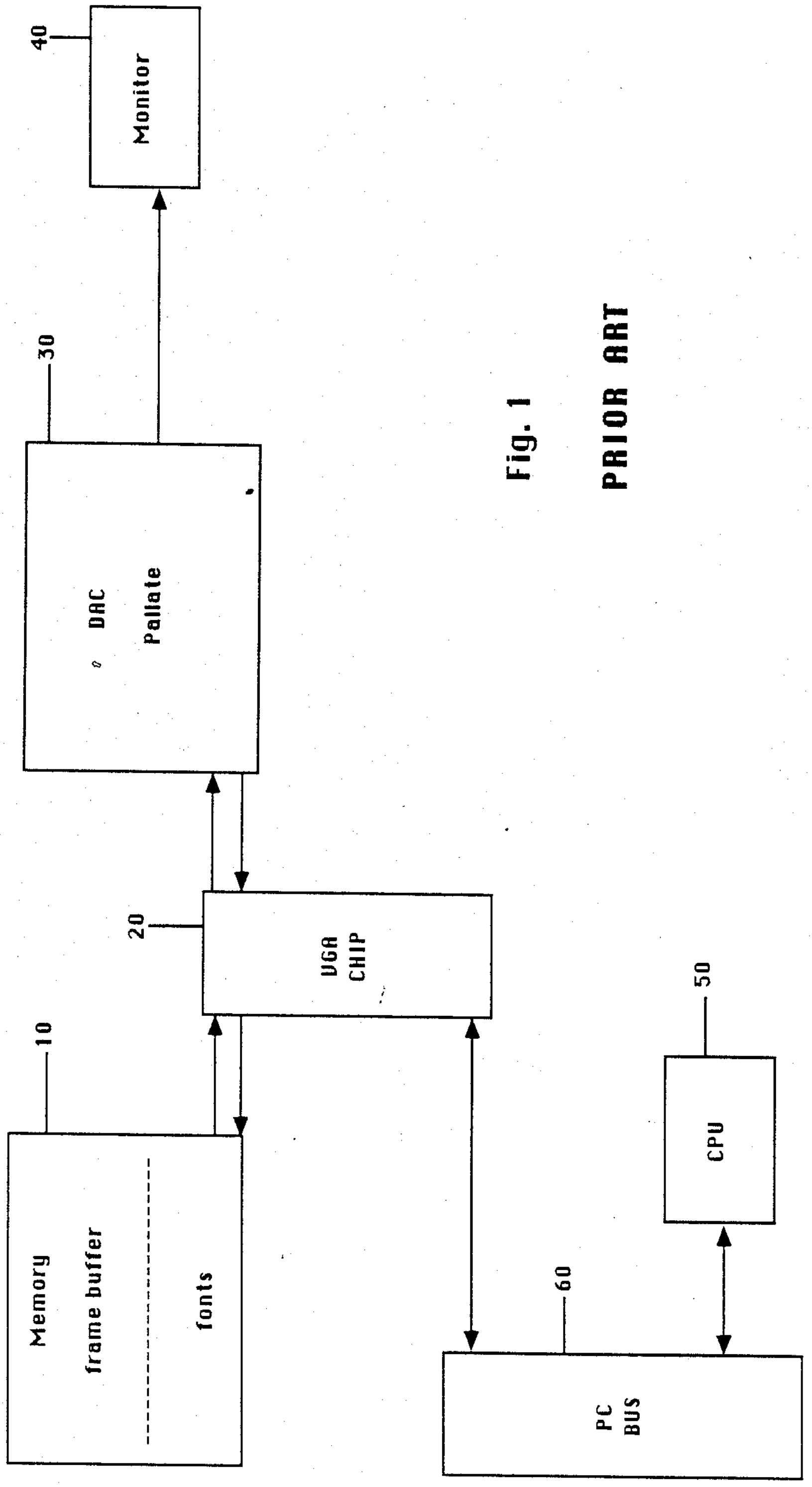
Fig. 1 PRIOR ART
FIG. 1 illustrates the VGA video adapter system.
Figure 2A:
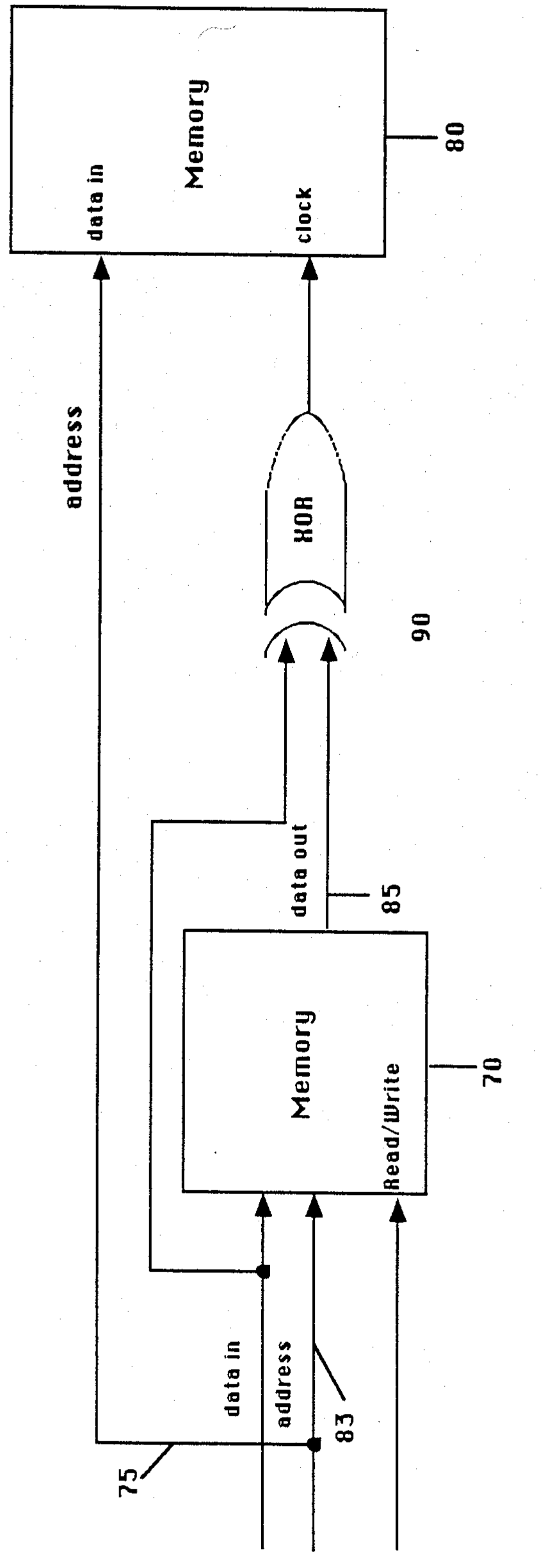
FIG. 2*a* and 2*b* illustrate one embodiment of the system of the present invention in which large amounts of memory containing raster data may be compared in real time.

Referring to FIG. 2*a* the system of the present invention comprises a first memory 70, exclusive OR circuit (XOR) 90, and a second memory 80. The first memory 70 may be any memory used to store large amounts of raster data such as digital video image or radar image data. Data to be written into memory is input via the data line 75 and the address the data is to be written to is input via address line 83. The raster data is consistently written to the same locations in memory such that like data to be compared, e.g. a pixel at a specific X-Y coordinate location, is always written to and read from the same address in memory. Thus a direct correlation is established between each pixel location and a memory location where the pixel information is stored. Prior to writing the data, (herein referred to as the "incoming data,") into memory, a read operation is performed to read the contents of the address the data is to be written to and the data (herein referred to as the "current data" is output on the data out line 85 to a first input read pin of XOR circuit 90. The incoming data on line 75 is input to a second input pin of XOR 90 and the current data and incoming data are compared. The output of the XOR circuit 90 indicates whether the incoming data and the current data is the same. If the output of XOR circuit 90 indicates that the data is not the same, the data memory address on line 83 is clocked into a second memory 80 for storage.

Immediately after the current data is read from memory 70, the incoming data is written into memory at the address on address line 83. Preferably the memory write operation is performed concurrently with the XOR operation to minimize the number of clock cycles required to perform the comparison of data and the storage of data into memory. Thus the steps of reading the data from memory and comparing the current data to the incoming data preferably takes place in one memory cycle. During the second memory cycle the incoming data is written into memory 70 and concurrently with that cycle the address of the memory location is stored in memory 80 if the current data and the incoming data are not the same. Although it is preferred that the information stored in memory 80 is the memory location, other information which identifies the data, such as the X-Y coordinate location of the corresponding pixel on the display, may be used.

The process and apparatus can be expanded to read, compare and write multiple bits during the same memory cycle. If the memory 70 is a 32 bit wide memory, the 32 bits of data would be input over 32 data lines to the 32 data input pins of the memory 70 which would write the 32 bits into memory within one cycle. Prior to writing the data into memory, the 32 bits of the current data would be read and output through the 32 data output pins to 32 input pins of one or more comparator circuits (depending upon the number of inputs to each comparator circuit), which would simultaneously compare the 32 bits of incoming data and current data and output data indicative of the bits which differed and this information would be stored in memory.

Figure 2B:
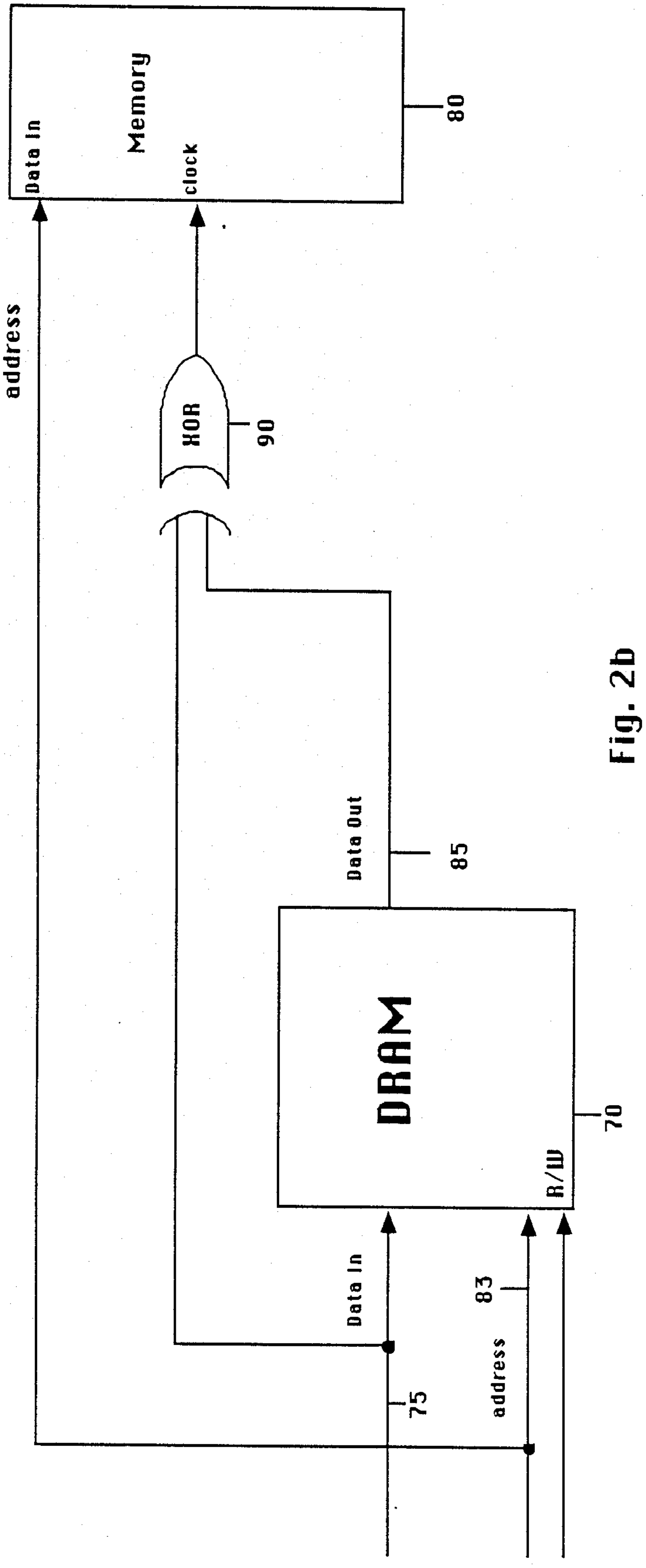

FIG. 2*b* illustrates the preferred configuration of this embodiment of the present invention. Although any type of read/write memory may be used, it is preferred that the system of the present invention employs Dynamic Random Access Memory (DRAM). The DRAM offers a single cycle memory operation referred to as the read-modified-write memory cycle (RMW). In the RMW, prior to writing data, the old data currently stored in the memory is read and output from memory on the data out line. This memory operation is preferred because the data currently stored in the memory is read out and the new data is written into memory within one memory cycle, and therefore, the process of reading the current data from memory, comparing the incoming data and the current data and writing the incoming data into memory can be performed within one memory cycle. This embodiment is particularly useful when examining digital video images or other types of raster data to determine changes in the data. An illustration is the processing of radar signals wherein it is important to note the movement of "blips" or images representative of aircraft or the like among the radar signals. This embodiment is also useful to determine changes in seismic or geological data wherein the majority of information remains the same with minor deviations in the data.

Furthermore, this embodiment may be utilized in the area of digital video imaging wherein real time updating of rasterized or digital video images is achieved by transmitting only those portions of the image that have changed since the last time the image was transmitted. A bottleneck in the digital video imaging process is the time required to transmit the raster data representative of the video image from an input means to an output means, such as from the CPU to the frame buffer or from the origin to the final destination of the video image, for example, across telephone lines or satellite links as is frequently done in video teleconferencing. Thus it is preferred that the amount of data that is needed to transmit is minimized. This is often done through data compression techniques wherein the video data is compressed prior to transmission and subsequently expanded after receipt of the transmission. However, the process may be simplified and the transmission time minimized by transmitting only the data representative of the portions of the image changed since the last transmission. The increase in transmission speed is significant because in most applications the amount of change occurring in a video image when the image is frequently updated is a small percentage of the total image.

Figure 3:
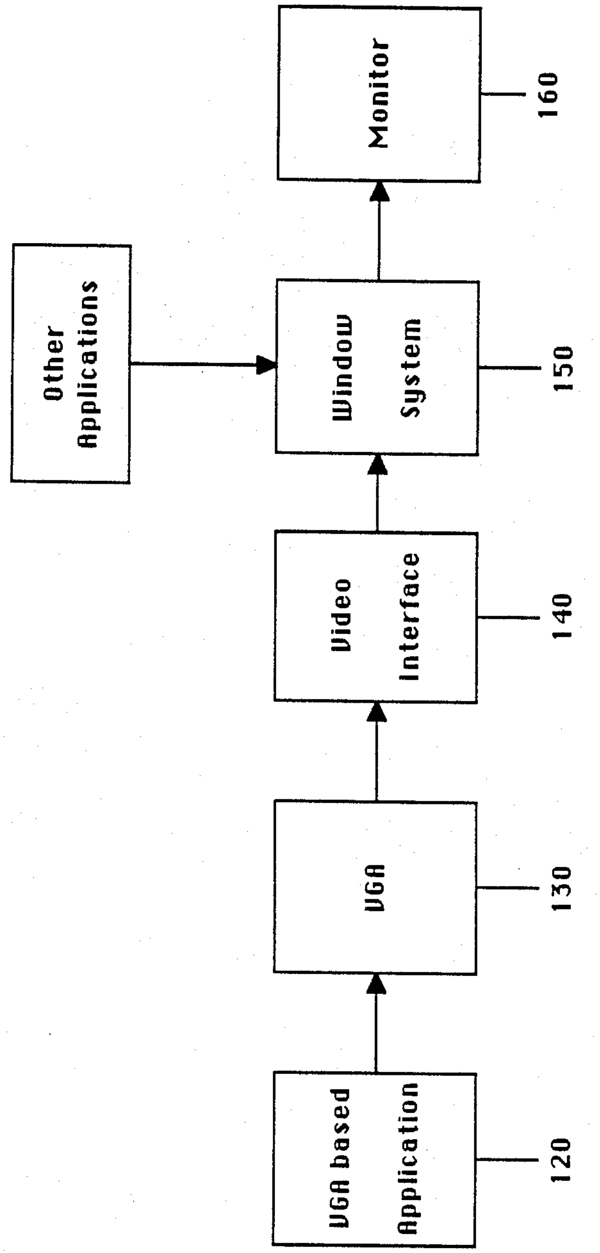
FIG. 3 illustrates a block diagram depicting another embodiment of the system of the present invention, a video system interface, as it functionally relates to the VGA video system and a windowing system.

One application, where the system of the present invention has been particularly useful, illustrated in part by FIG. 3, is to provide an interface between a video adapter such as a video graphics array (VGA) and a video system incompatible with the video adapter, such as a windowing system.

A computer program application which utilizes the VGA 120 communicates through the CPU the video data to be displayed to the VGA subsystem 130, and in particular the VGA controller chip. The output of the VGA controller chip, which in a typical VGA system is output through a digital to analog converter (DAC) and to a display monitor, is input to the video interface of the present invention 140. The video interface 140 converts the VGA output data into raster data which is compatible with and can be interpreted as input to the windowing system 150. The windowing system upon receiving the raster data then massages the data to display it in the proper window of the display. A more detailed block diagram of the video interface 140 is illustrated in FIG. 4.

Figure 4:
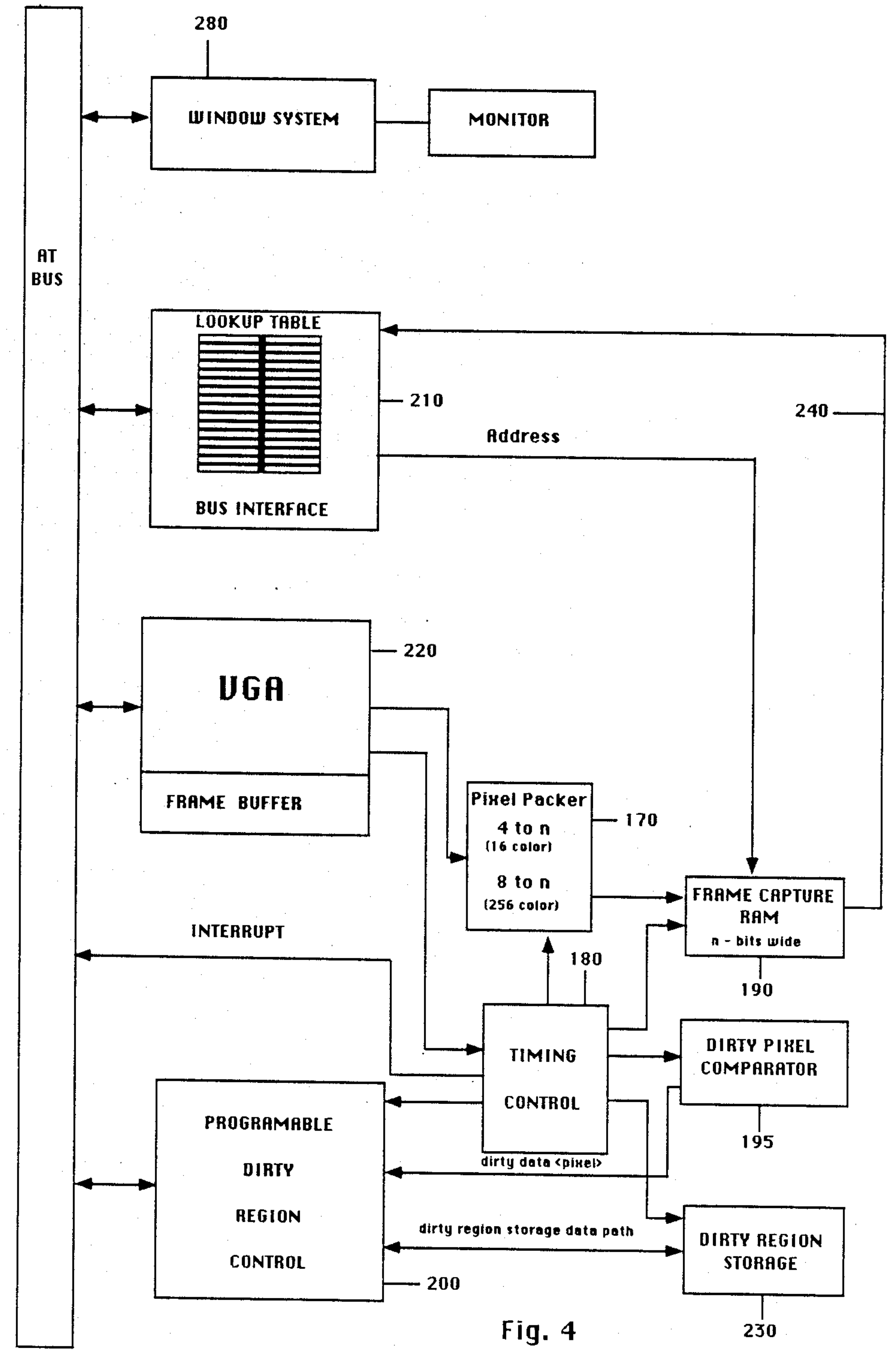
FIG. 4 is a block diagram of the video system interface of the present invention.

Referring to FIG. 4, the VGA interface comprises VGA controller chip 220, Pixel Packer 170, Timing Control 180, Frame Capture RAM 190, Dirty pixel comparator 195, Programmable Dirty Region Control 200, Bus interface/lookup table 210 and Dirty region storage 230. The timing control 180 controls the timing of all the components of the video interface and coordinates the timing of the video interface with the VGA and the windowing system. The timing control 180 controls the timing of the captures, the setting of the line length, retrace length, the number of lines and sends out an interrupt to the CPU after the capture and dirty pixel processing is complete to indicate that data is to be transferred to the windowing system. Timing control 180 receives timing signals from the VGA 220, such as the horizontal synchronizing signal, vertical synchronizing signal, blank signal and the clock signal, and provides the timing signals for the pixel packer 170, frame capture RAM 180, dirty pixel comparator 195, programmable dirty region control 200 and dirty region storage 230. The timing control 180 also contains several counters which are used in conjunction with the timing signals received from the VGA 220 to calculate the memory address in frame capture RAM 190 the pixel information output by pixel packer 170 is to be written to such that a pixel from a particular X-Y location is consistently written to the same address in the frame capture RAM.

When data is to be displayed or data currently displayed is to be changed or updated, the VGA-based application program indicates to the CPU the video data to be displayed. This information is transferred in VGA format to the VGA controller chip 220 which is the same VGA controller chip used in VGA video adapters presently available. The VGA controller 220 then performs the standard functions to generate the raster image. Once the raster image is generated, the raster data is transferred out of the VGA controller chip 220 pixel by pixel. In a standard VGA system, this information would be output to a DAC containing a color lookup table which would generate the proper control signals for output for display on the monitor. However, in this embodiment of the video interface of the present invention, the output of the VGA controller chip 220 is periodically "captured" for transmission to the Frame Capture RAM 190. Thus, for output, the pixel data typically a 4-bit word or nibble, is sent to the memory 190 herein referred to as frame capture RAM, for temporary storage.

Preferably, the data output by the VGA controller chip 220 is captured at a predetermined frequency. For example, the current raster image may be output by the VGA controller chip 220, "captured" and transferred to the frame capture RAM 190 once every ten seconds. This permits the control of the frequency of updates to the raster image displayed and can be increased or decreased according to the application outputting the raster data to accommodate applications which continuously change the raster image and those which change the raster image less often.

In order to minimize the number of memory cycles for transferring the raster image from the VGA to the frame capture RAM 190, it is preferred that the pixel data is sent in blocks of data comprising multiple pixels. Typically the block size is set to equal the width of the RAM 190 such that one row of data is written during each memory cycle. This is accomplished using pixel packer 170. Pixel packer 170 receives the pixel data from VGA controller 220 and stores the information until the amount of pixel information stored equals the size of the output block of data. The block pixel data is then output from pixel packer 170 and written to RAM 190 in one memory cycle. Preferably pixel packer 170 comprises a multi-bit shift register or latch n-bits long wherein "n" equals the width of the RAM 190 such that pixel data is written in RAM one row at a time.

The frame capture RAM 190 is preferably a DRAM with the read-modified-write mode enabled such that data may be read out of memory and written into memory within one memory cycle. Thus, within a single memory cycle, the current data stored in the DRAM may be read from memory, the incoming data to the RAM, that is the data output by pixel packer 170, may be written into memory and the current data and the incoming data can be compared using the dirty pixel comparator circuit 195 to determine if the data has changed. Preferably dirty pixel comparator circuit 195 compresses a multiple bit XOR circuit such as the one described above with respect to FIG. *2b*. The information indicating the locations of the pixels have changed, referred to as the dirty pixel data, is transferred to the programmable dirty region control circuit 200. The programmable dirty region control circuit 200 analyzes the data that has been changed and determines the groups or regions of raster data ("dirty regions") to be transmitted to the window system for updating the displayed raster image. Once the dirty regions have been determined by programmable dirty region control 200, the X-Y coordinate limits of the dirty regions are stored in dirty region storage memory 230. Although dirty region storage memory is shown as a separate memory from the frame capture RAM 190, it may physically be on the same memory chip as the frame capture RAM 190 in order to conserve space.

The programmable dirty region control 200 uses a predetermined set of control parameters to analyze the dirty pixel data and its location in relation to one another and group the dirty pixel data into regions, referred to as "dirty pixel regions", according to its X-Y coordinate location within the raster image.

The control parameters used to determine the dirty pixel regions that are to be updated on the display vary according to the sophistication and optimization of the system desired. The windowing system adds significantly to the system overhead, slowing down the processing speed of the system. Thus, it is desirable that the number of system calls to the windowing system is minimized. The amounts of data transmitted between components in the system also impacts the overall processing speed of the system. Therefore, it is also desirable to minimize the amount of data to be transferred to the windowing system. To optimize the speed of the system, for example, the parameters which control programmable dirty region control 200 can be set such that each region comprises a single dirty pixel or that any one dirty region is determined comprising all the dirty pixels of the video image. However it is preferred the programmable dirty region control 200 is programmed to form dirty regions which balance the advantage of issuing as few commands as possible to the window system and minimizing the amount of video data that has to be transferred and processed by the windowing system. The parameters used to control the programmable dirty region control circuit preferably comprise the maximum size of a dirty region in the horizontal direction (XMAX), the maximum size in the vertical (YMAX), the minimum number of clean pixels horizontally between dirty regions (XCLEAN) and the minimum number of clean pixels vertically between dirty regions (YCLEAN). XMAX and YMAX limit the size of a dirty region of a raster image. This is to prevent the transmission of an entire raster image in the instance of a shape, such as a full screen cross-hair, which may extend over a large portion of the screen but only a small number of pixels in limited areas of the screen are affected. The minimum clean parameters, XCLEAN and YCLEAN limit the number of regions and thus the number of calls to the windowing system.

Preferably, the programmable dirty region control 200 hardware comprises a state machine or microprocessor which analyzes the data using parameters provided. The parameters may be preset or they may be adjusted according to the type of application. For example the size of the dirty regions may be decreased if it is found that the ratio of the number of dirty pixels in the region to the total number of pixels in the region is small. Furthermore the parameters may be altered dynamically consistent with the type of video output generated. The processor may analyze the video output concurrently with the analysis of dirty pixels and determine the optimum parameters, e.g. dirty pixel region size and number of regions, for the video data.

Figure 5:
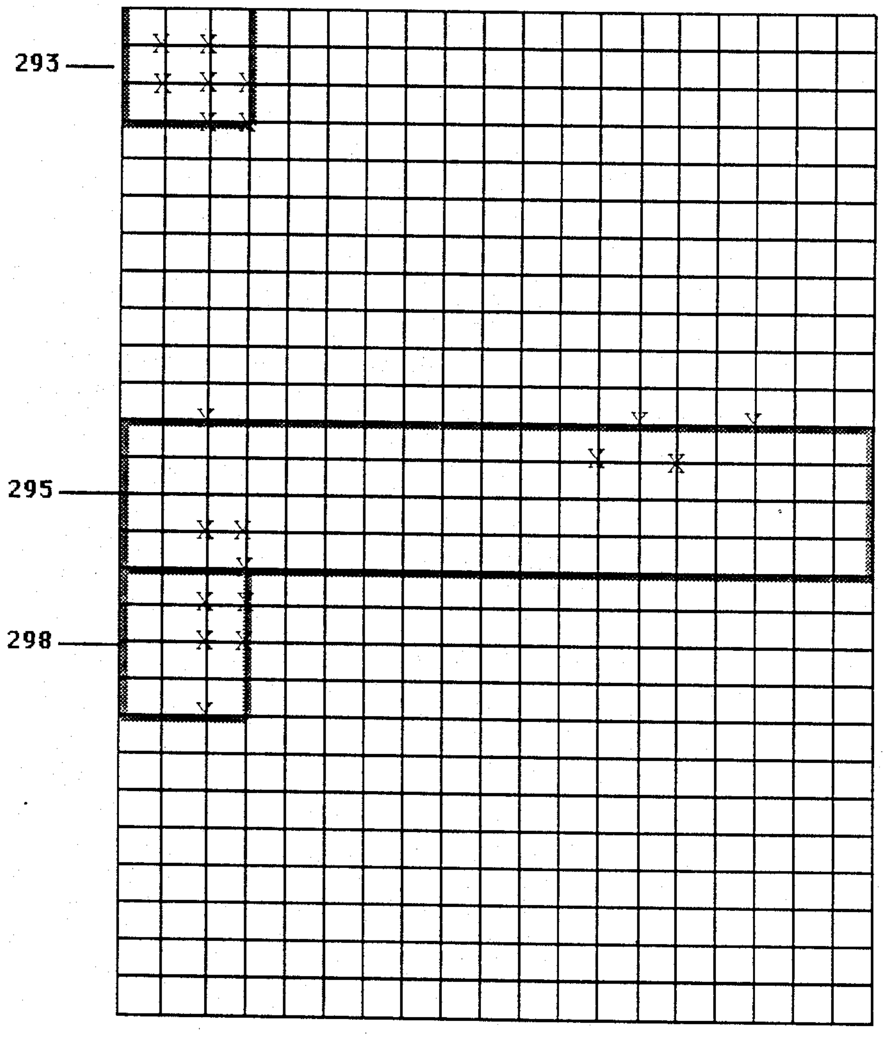
FIG. 5 illustrates the formation of dirty regions from dirty pixels in the video system interface of the present invention.
Figure 6A:
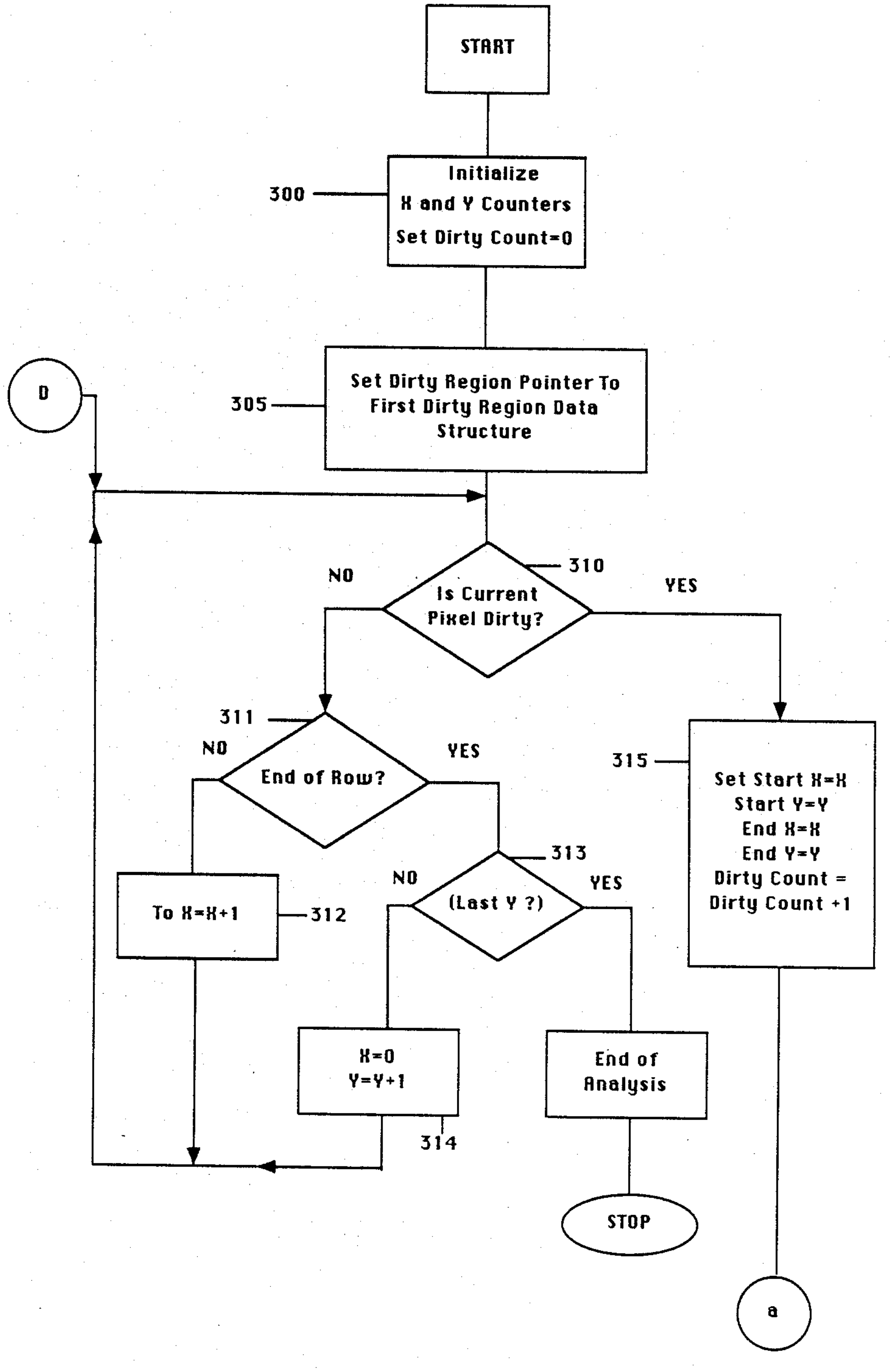
FIGS. 6*a* and 6*b* is a flow chart illustrating the process steps performed by the programmable dirty region central of the new system interface of the present invention to determine dirty pixel regions.
Figure 6B:
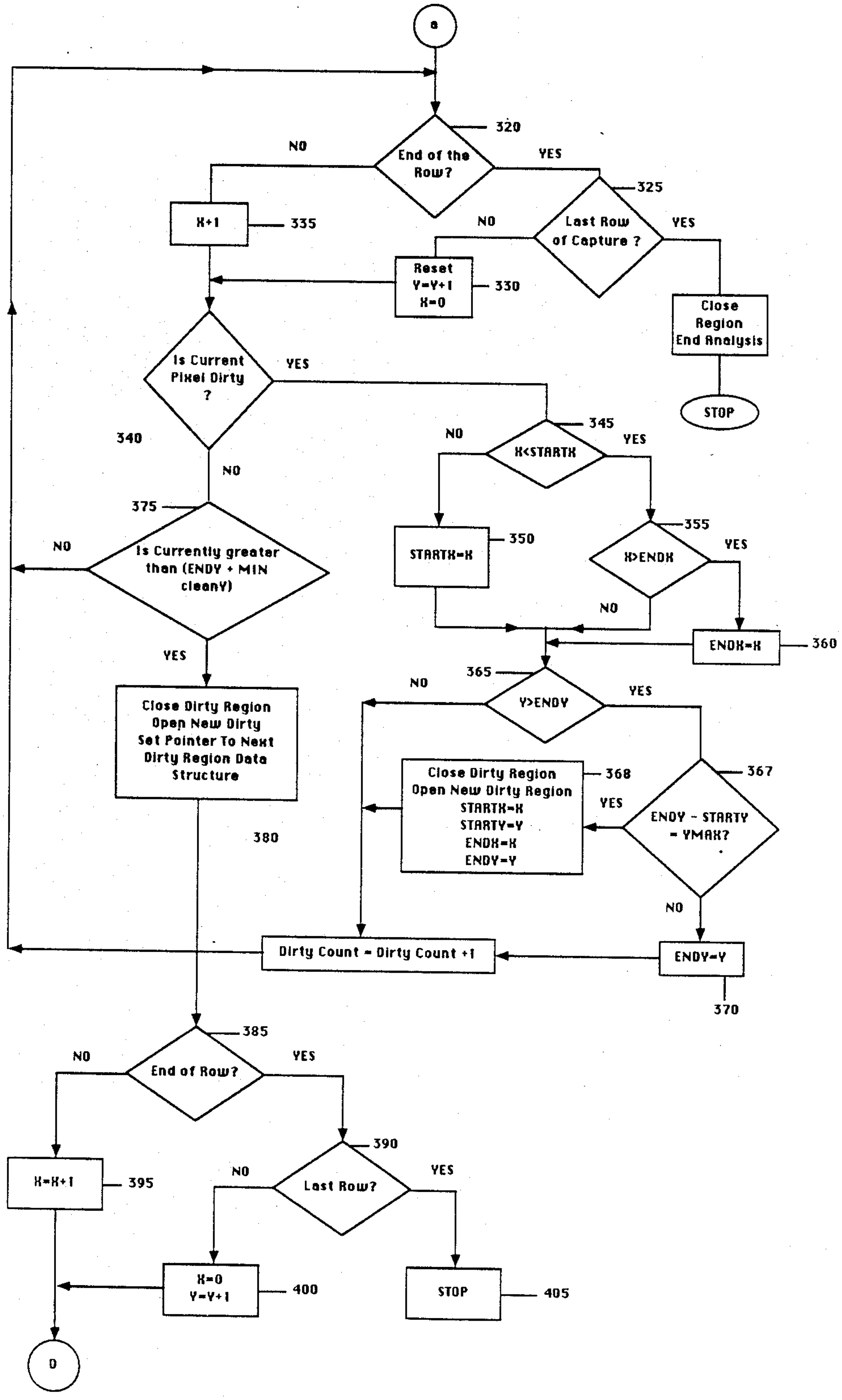

An illustrative process for analyzing dirty pixel data is presented in the flow charts of FIG. *6a* and FIG. *6b*. This exemplary process permits one region per scan line with the X coordinate limits of the regions determined by the rightmost and leftmost dirty pixels within each region. The number of scan lines which comprise each region is limited to a predetermined maximum number of scan lines. In addition, if a predetermined number of scan lines do not contain dirty pixels (i.e. the scan lines comprise "clean pixels"), the dirty region will be closed at the last scan line containing dirty pixels and a new dirty region will be formed at the next occurrence of a dirty pixel. The resulting regions after analysis of the dirty pixel using this process is illustrated in FIG. 5. FIG. 5 is a simplified drawing of a raster image showing dirty pixels at the pixel locations marked with an "X". For purposes of illustration, assume that a region can not be larger than five scan lines, and if there are three clean scan lines (i.e., no dirty pixels), the current dirty region is closed and a new dirty region is opened. According to the above parameters, three dirty regions 293, 295, and 298 would be defined.

Referring to the flow chart of FIG. *6a*, at block 300 the X and Y counters are initialized and the dirty pixel count is set to zero. The X-Y counters are used to keep track of the X,Y coordinate location of current pixel being analyzed, and the dirty pixel count keeps record of the number of dirty pixels and may be used to control the size of the dirty regions. If the capture of the raster image began at the beginning of the image, that is immediately after the retrace signal, the X and Y counters would be set to zero. However, if the capture began at another portion of the raster image, e.g. at the 20th scan line, the X counter would be to zero and the Y counter would be initialized to 20.

At block 305 the dirty region pointer used to point to the data structure of "open" dirty pixel region is set. At block 310 the current pixel as indicated by the X and Y counter is analyzed to determine whether the pixel is dirty. If the pixel is dirty, at block 315, the dirty region pointers and counters, STARTX, STARTY, ENDX, ENDY, are set to track the beginning of the dirty region. Thus, the dirty region is defined by a STARTX, STARTY indicating the upper left hand corner of the dirty region, and ENDX, ENDY indicating the bottom right hand corner of the dirty region. Initially, STARTX and ENDX are set to the current X coordinate location as indicated by the X pointer, and STARTY and ENDY are set to the current Y coordinate location as indicated by the Y pointer. In addition, the count of dirty pixels is started by having a value of one to track the total number of dirty pixels per capture image.

Once the STARTX, STARTY, ENDX, ENDY parameters have been adjusted, at block 320, the location of the dirty pixel is examined to determine whether the end of a scan line has been reached. If the end of the scan line has been reached, at block 325, the pixel location is examined to determined whether the last row of the capture has been reached. If the last row of the capture has been reached, at block 330 the analysis of the current video image is complete. If at block 325 the bottom of the screen has not been reached, at block 330 the X and Y counters are adjusted such that Y counter is incremented by one, and the X counter is reset to 0 whereby the counters point to the beginning (leftmost pixel) of the line one line below the scan line just analyzed. If at block 320 the end of the row has not been reached, then at block 335 a value of one is added to the X counter indicating that the next pixel to the right of the pixel just examined is to be analyzed.

At block 340, the next pixel is analyzed to determined whether it is a dirty pixel. If it is a dirty pixel, at block 345 the system determines whether the current X location is to the left of the current STARTX location. If the current X is to the left of STARTX, at block 350 the STARTX parameter is adjusted to the value equal to the X counter. If at block 345 the current X location is not to the left of the STARTX, then at block 355 it is determined whether the current X location is to the right of the ENDX location. If it is beyond the region as currently defined by ENDX, then at block 360 ENDX is adjusted to be equal to the current X location. Similarly, at block 365, the current Y location is compared to STARTY and ENDY to determine if it is within the current Y boundaries of the open dirty region. Thus at block 365, the current Y location is compared to the ENDY location. If the current Y location is below ENDY at block 367 a second check is performed to determine whether the open dirty region comprises the maximum number of scan lines allowed (YMAX). If the open dirty region comprises the maximum number of scan lines at block 368 the dirty region is closed and a new dirty region is opened whereby STARTX, ENDX are set to equal the X counter and STARTX and ENDY are set to equal the Y counter. If the open dirty region does not comprise the maximum number of scan lines at block 370 ENDY is adjusted to be equal to the current Y location.

After the limits of the region, that is the STARTX, STARTY, ENDX and ENDY parameters, have been adjusted as necessary the dirty count is increased for the region and the process returns to block 320 where the steps are repeated again until the end of the capture has been reached.

If at block 340 the current pixel being examined is not dirty, at block 375 the current Y location is examined to determine whether the Y location is greater then the ENDY location of the current dirty region plus the minimum clean Y (MINCLEANY) parameter that is preset in the system. The minimum clean Y parameter provides the minimum number of continuous clean scan lines between dirty regions. Therefore if the minimum number of continuous clean scan lines are found the open dirty region will be closed and any subsequent dirty pixels found will be part of a new dirty region. Thus if the scan line at the current Y location which is clean is currently greater than the sum of ENDY plus MINCLEANY, at block 380 the open dirty region is closed and a new dirty region is opened. At blocks 385, 390, 395, 400, 405 the X, Y counters are incremented to point to the next pixel location to be examined and the process continues at block 310, whereby the process continues until the bottom of the last row of the capture has been examined. This coordinate boundaries of each dirty pixel region is transmitted to the windowing system.

Once the programmable dirty region control 200 has finished analyzing the dirty pixel data and the dirty pixel regions have been formed, an interrupt signal is sent to the CPU through the bus 230 to notify the CPU that there is data to be output to the windowing system. The CPU then reads the dirty region information containing the XY boundaries of the dirty regions (STARTX, STARTY, ENDX, ENDY) and uses the boundaries of each region to read through commands sent to the programmable dirty region control 200, the corresponding frame capture RAM locations containing the raster data within the boundaries of the region. In response to the memory feed regions, the raster data is output through the bus interface/table lookup 210 onto the bus 230 to the windowing system, whereby the windowing system massages the data within the dirty pixel region and outputs the data to the proper window of the display.

When the pixel data is read from the frame capture RAM, the data is output along bus 240 to the lookup table in bus interface /lookup table 210. In the lookup table, the color code for each pixel is converted to the proper format acceptable by the windowing system. This is done by a simple lookup table wherein the current color code output from the frame capture RAM indexes the location in the table and outputs the code read from that indexed location. In addition, if the pixel data is represented by a 4-bit code, such as VGA format data, and the windowing system requires an 8-bit code, the lookup table changes the code from a 4-bit code to a compatible 8-bit code. Preferably the color lookup table comprises two identical lookup tables each indexed by a four bit number. This is to accommodate the incoming data from the frame capture RAM 190 which is transmitted in a 4 bit/pixel format. Thus when the bus interface/color lookup recieves 8 bits of raster data corresponding to two pixels, the lower 4 bits index to the first color lookup table and the higher 4 bits index to the second lookup table to translate the raster data.

While the invention has been described in conjunction with the preferred embodiment, it is evident that numerous alternatives, modifications, variations and uses will be apprent to those skilled in the art in light of the foregoing description. In particular it is evident that the VGA interface described may also be used in conjunction with other video systems including which do not provide for a windowing capability. In addition it is evident that the VGA interface may be adapted to be provide a system interface for other vido adapters such as the EGA and Hercules video adapters.

I claim:

1. In a computer graphics system for the generation and display of raster data images comprising a central processing unit (CPU) coupled to a memory means, said CPU further being coupled to a display means for the display of a raster data image, said raster data image comprising a plurality of pixels, each pixel identified at an X-Y coordinate location within the raster data image, a method for comparing a first and a second raster data image in real time wherein a pixel at a specific X-Y coordinate location in the second raster data image is compared to a pixel at the specific X-Y coordinate location in the first raster data image as each pixel of the second raster data image is generated, said method comprising the steps of:

writing the first raster data image into memory such that each pixel data representative of a pixel at a predetermined X-Y coordinate location in the image is written to predetermined memory location;

receiving a pixel data of the second image being generated, said pixel data representative of a pixel located at a specific X-Y coordinate location in the second raster data image:

reading the first raster data image stored in memory to retrieve pixel data corresponding to a pixel in the first raster data image at the specific X-Y coordinate location;

inputting to a comparator circuit the pixel data read from memory and the pixel data of the second raster data image received; and if the comparator output indicates that the pixel data read from memory and the pixel data of the second raster data image are not the same, recording the identification of the X-Y coordinate location of the pixel data to indicate that the pixel data has changed.

2. The method of claim 1 wherein the first raster data image is an image representative at a first time period and the second raster data image is the image representative at a second time period subsequent to the first time period.

3. The method of claim 2 wherein the image captured is a radar image.

4. The method of claim 2 wherein said image captured is a digitized video image.

5. The method of claim 1 further comprising the steps of:

after the pixel data of the first raster data image is read from memory, writing the pixel data of the second raster data image received into the predetermined memory location corresponding to the X-Y coordinate location wherein after the second raster data image is completely generated and all the pixel data of the first raster data image are read from memory and compared to the pixel data of the second raster data image, the memory is updated to contain the pixel data from the second raster data image such that the second raster data image can be subsequently read from the memory and compared to a third raster data image.

6. The method of claim 5 wherein the first raster data image is an image representative at a first time period and the second raster data image is a image representative at a second time period subsequent to the first time period.

7. The method of claim 5 wherein said memory is a DRAM with a memory read-modified-write mode enabled such that pixel data is read from and written to a specific memory location in one memory cycle.

8. The method of claim 6 further comprising the steps of:

analyzing the X-Y coordinate locations of the pixel data that have changed to group the changed pixels into geographic regions; and updating the raster data image displayed on the display means with the second raster data image by updating only those regions of the display means corresponding to the regions containing changed pixels.

9. In a computer graphics system for the generation and display of raster data images comprising a central processing unit (CPU) coupled to a memory means said CPU further being coupled to a display means for the display of a raster data image, said raster data image comprising a plurality of pixels, each identified at an X-Y coordinate location within the raster data image, an apparatus for companying a first and a second raster data image in real time wherein a pixel at a specific X-Y coordinate location in the second raster data image is compared to a pixel at the specific X-Y coordinate location in the first raster data image as each pixel of the second raster data image is generated, said apparatus comprising:

means for writing the first raster data image into memory such that each data representative of a pixel at a predetermined X-Y coordinate location in the image is written to predetermined memory location;

means for receiving a pixel data of the second image being generated, said pixel data representative of a pixel located at the specific X-Y coordinate location in the second raster data image;

means for reading the first raster data image stored in memory to retrieve pixel data corresponding to a pixel in the first raster data image at the specific X-Y coordinate location;

a comparator circuit which receives as input and compares the pixel data read from memory and the pixel data of the second raster data image received; and means for recording the identification of the X-Y coordinate location of the pixel data to indicate that the pixel data has changed if the comparator output indicates that the pixel data read of memory and the corresponding pixel data from the second raster data image are not the same.

10. The apparatus of claim 9 wherein the first raster data image is an image representative at a first time period and the second raster data image is the image representative at a second time period subsequent to the first time period.

11. The apparatus of claim 10 wherein the image captured is a radar image.

12. The apparatus of claim 11 wherein said image captured is a digitized video image.

13. The apparatus of claim 9 further comprising:

means for writing the pixel data of the second raster data image into the predetermined memory location after the pixel data of the first raster data image is read from memory, wherein after the second raster data image is completely generated and all the pixel data of the first raster data image are read from memory and compared to the corresponding pixel data of the second raster data image, the memory is updated to contain the pixel data from the second raster data image such that the second raster data image can be subsequently read from the memory and compared to a third raster data image.

14. The apparatus of claim 13 wherein the first raster data image is an image representative at a first time period and the second raster data image is a image representative at a second time period subsequent to the first time period.

15. The apparatus of claim 13 wherein said memory is a DRAM with a memory read-modified-write mode enabled such that pixel data is read from and written to a specific memory location in one memory cycle.

16. The apparatus of claim 14, said apparatus further comprising:

means for analyzing the X-Y coordinate locations of the pixel data that have changed to group the changed pixels into geographic regions; and means for updating the raster data image displayed on the display means with the second raster data image by updating only those regions of the display means corresponding to the regions containing changed pixels.

17. A method for interfacing output generated by a video graphics adapter to a graphics display system incompatible with. the video graphics adapter, said video graphics adapter generating a raster data image in a first format and said graphics display system receiving as input a raster data image in a second format, said raster data image comrpising plurality of pixels, each pixel identified at an X-Y coordinate location within the raster data image said method for interfacing comprising:

writing a raster data image in said first format generated by the video graphics adapter into memory such that each pixel data representative of a pixel at a predetermined X-Y coordinate location in the image is written to a predetermined memory location;

receiving pixel data of a second raster data image a pixel at a time from said video graphics adapter, said pixel data being in said first format generated by the video graphics adapter and representative of a pixel at a specific X-Y coordinate location in the second raster data image, said second raster data image generated subsequent to said first raster data image;

reading pixel data from a predetermined memory location representative of a pixel of the first raster data image at the specific X-Y coordinate location:

inputting to a comparator circuit the pixel data of the first raster data image read from memory and pixel data of the second raster data image received from the video graphics adapter;

if the pixel data of the first raster data image read from the memory and the pixel data of the second raster data image received from the video graphics adapter are not the same, storing the identification of the X-Y coordinate location of the pixel to indicate that the pixel has changed from the pixel data of the first raster data image to the pixel data of the second raster data image:

writing the pixel data from the second raster data image into memory at the predetermined memory location which corresponds to the X-Y coordinate location of the corresponding pixel in the first raster data image;

translating the pixel data, from the second data raster image which has changed, from the first raster data format to the second raster data format;

inputting the tranalated pixel data to the graphics display system in the second raster data format compatible with the graphics display system for output to the display means; and updating portions of the display corresponding to the locations of the pixels which have changed with the translated pixel data thereby updating the display from the first raster data image to the second raster data image.

18. The method of claim 17 further comprising the steps of:

once the second raster data image has been completely generated analyzing the locations of the pixels that have changed to group the changed pixels into geographic regions within the raster data image;

wherein the geographic regions of pixels from the second raster data image are translated and input to the graphics display system for updating the geographic regions on the display.

19. In a computer graphics system comprising a display means for the display of raster data image, said raster data image being in a second raster data image format, said display means displaying a first raster data image said raster data image comprising a plurality of pixels, each pixel identified at an X-Y coordinate location within the image, an apparatus for updating the display means with a second raster data image in real time as the second raster data image is generated by a video graphics adapter, said second raster data image being generated by a video graphics adapter, said second raster data image being generated in a first raster data image format incompatible with the second raster data image format, said apparatus comprising:

a first memory means for storing the first raster data image in the first format;

means for writing the first raster data image into the first memory means such that each pixel data representative of a pixel at a predetermined X-Y coordinate location in the image is written to a predetermined memory location;

means for receiving the second raster data image as each pixel is generated by the video graphics adapter, said second raster data image generated subsequent to said first raster data image, each pixel data received being representative of a pixel at a specific X-Y coordinage location in the second raster data image;

means for reading pixel data of the first raster image from the first memory means at a predetermined memory location corresponding to the specific X-Y coordinate location;

a comparator circuit which compares the pixel data read from the memory and pixel data generated for the second raster data image to determine whether the pixel has changed from the first raster data image to the second raster data image;

a second memory means for storing the identification of the pixel location to indicate that the pixel has changed from the first raster data image to the second raster image, if the pixel data read from the first memory means and the corresponding pixel data generated for the second raster data image are not the same;

means for translating the pixel data, generated for the second raster data image of the pixels which have changed, from the first raster data format to the second raster data format; and means for inputting the translated pixel data to the computer graphics system in the second raster data format compatible with the computer graphics system for output to the display means;

whereby the computer graphics system updates portions of the display means corresponding to the changed pixels with the translated pixel data from the second raster data image.

20. The apparatus of claim 19 further comprising:

once all the pixels of the second raster data image have been generated, means for analyzing the locations of the pixels that have changed to group the changed pixels into geographic regions of the raster data image;

wherein the geographics regions of pixels are translated and the pixel data are input to the computer graphics system for updating geographic regions on the display means.

21. The apparatus of claim 20 wherein the means for analyzing comprises a state machine.

22. The apparatus of claim 20 wherein the means for analyzing comprises a microprocessor.

23. The apparatus of claim 19 wherein the video graphics adapter is a Video Graphics Array and the graphics display system is a windowing system.

24. The apparatus of claim 19 wherein the comparator circuit is an exclusive OR circuit.

25. The apparatus of claim 19 wherein the identification of the pixel location stored to indicate that the pixel has changed comprises the memory location the pixel data was written to.

26. The apparatus of claim 19 further comprising means for writing the second raster data image into the first memory means such that each pixel data representative of a pixel at a specific X-Y coordinate location in the second raster data image is written to the predetermined memory location for the specific X-Y coordinate location in the raster data image after the pixel data of the first raster data image is read from the predetermined memory location in the first memory means.

27. The apparatus of claim 26 wherein the first memory means is a dynamic random access memory with the read-modified-write mode enabled such that pixel data of the first raster data image can be read from memory and pixel data of the second raster data image can be written into memory within one memory cycle.

28. The apparatus of claim 26 wherein the means for translating the pixel data that have changed comprises:

means for reading from the second memory means the identification of X-Y coordinate locations which indicate the pixels that have changed;

means for reading from the first memory means the pixel data of the second raster data image at the predetermined memory locations corresponding to changed pixels as identified by the means for reading the second memory means; and a table lookup means which provides a translation between the first raster data format and the second raster data format, wherein the pixel data read from the first memory means is input to the table lookup means and the translation is output from the table lookup means for input to the computer graphics system.

29. The apparatus of claim 19 further comprising a timing circuit which receives as input the video timing signals from the video graphics adapter and synchronizes the reading, writing and comparison of pixel data.

30. The apparatus of claim 19 further comprising pixel packing means for receiving at least one pixel data, the storage size of the pixel packing means corresponding to width of the first memory means, whereby the pixel packing means recives pixel data until the contents of the pixel packing means is full and writes the contents of the pixel packing to the first memory means in one memory cycle.

31. The apparatus of claim 30 wherein said timing circuit provides the memory locations the pixel data of the raster data image are written to.

32. The apparatus of claim 19 wherein said translating means comprises a color lookup table.

* * * * *

UNITED STATES PATENT AND TRADEMARK OFFICE
CERTIFICATE OF CORRECTION

PATENT NO. : 4,958,378

DATED : 9/18/90

INVENTOR(S) : Bell

It is certified that error appears in the above-identified patent and that said Letters Patent is hereby corrected as shown below:

| | | |
|---|---|---|
| col. 10, line 22 | delete "feed" | insert --read-- |
| col. 10, line 52 | delete "apprent" | insert --apparent-- |
| col. 10, line 55 | after "including" | insert --systems-- |
| col. 10, line 58 | delete "vido" | insert --video-- |
| col. 12, line 11 | delete "companying" | insert --comparing-- |
| col. 13, line 21 | delete "comrpising" | insert --comprising-- |
| col. 13, line 25 | after "a" | insert --first-- |
| col. 13, line 62 | delete "tranalated" | insert --translated-- |
| col. 14, line 40 | delete "coordinage" | insert --coordinate-- |
| col. 14, line 42 | after "raster" | insert --data-- |
| col. 16, line 28 | delete "recives" | insert --receives-- |

Signed and Sealed this

Eighteenth Day of May, 1993

*Attest:*

MICHAEL K. KIRK

*Attesting Officer*

*Acting Commissioner of Patents and Trademarks*